United States Patent [19]

Carpentier

[11] Patent Number: 4,945,838
[45] Date of Patent: Aug. 7, 1990

[54] POST-COMBUSTION CHAMBERS

[75] Inventor: Serge Carpentier, Villecresnes, France

[73] Assignee: Societe Generale pour les Techniques Nouvelles, Saint Quentin en Yvelines Cedex, France

[21] Appl. No.: 258,002

[22] Filed: Oct. 14, 1988

[30] Foreign Application Priority Data

Apr. 28, 1988 [FR] France ................ 88 05704

[51] Int. Cl.⁵ .................. F23B 5/00; F23C 9/00; F23G 7/06
[52] U.S. Cl. .................. 110/211; 55/482; 110/216; 422/177
[58] Field of Search ........... 110/211, 212, 216; 431/5; 422/177; 55/482, 486

[56] References Cited

U.S. PATENT DOCUMENTS

| | | | |
|---|---|---|---|
| 3,568,611 | 3/1971 | Konrad | 110/99 |
| 4,286,528 | 9/1981 | Willard | 110/216 |
| 4,324,570 | 4/1982 | Pforr et al. | 55/267 |
| 4,454,826 | 6/1984 | Benedick | 110/211 |
| 4,474,118 | 10/1984 | Benedick | 110/211 |
| 4,650,414 | 3/1987 | Grenfell | 110/211 X |

FOREIGN PATENT DOCUMENTS 1578136  7/1969  France .
2090402  1/1970  France .

OTHER PUBLICATIONS

Carpentier, S., "Excess-Air Incineration with High Temperature Filtering for Efficient Off-Gas Cleaning", Nov. 29-Dec. 5, 1987, pp. 235-243, *Proceedings of the 1987 Waste Management Conference,* Oyen, L. C. et al. (ed.).

*Primary Examiner*—Edward G. Favors
*Attorney, Agent, or Firm*—Bryan, Cave, McPheeters & McRoberts

[57] ABSTRACT

A post-combustion chamber for treating the gases coming from a combustion chamber, the post-combustion chamber comprising a conical bottom (9) extended by a tube (10), and being separated into two compartments by a vertical wall (14), with both of said compartments containing a filter bed, said bed rising to a lower level in the compartment via which the gases enter than in the other compartment, said chamber also including an opening for removing gases which have passed through said filter bed and an opening in the top of the compartment via which the gases leave for inserting filter bed material, wherein the bottom of the vertical wall (14, 27) is terminated by an arch (28) of refractory bricks bearing against opposite surfaces of the conical bottom of the post-combustion chamber.

2 Claims, 3 Drawing Sheets

POST-COMBUSTION CHAMBERS

IMPROVEMENTS IN POST-COMBUSTION CHAMBERS

The invention relates to a device known as a port-combustion chamber which is placed immediately after a combustion chamber and which serves to purify flue gases coming from the combustion chamber.

BACKGROUND OF THE INVENTION

The principle of such post-combustion chambers is already described, for example in French patent No. FR 1 578 136.

Combustion products are not always completely incinerated, in particular when they include waste containing cellulose or plastic materials. Gases leave the combustion chamber charged with carbon black, unburned residues, and toxic pollutants (phosphene, dioxine, . . . ) due to incomplete decomposition.

French patent No. 1 578 136 shows that such gases may be treated and purified in a post-combustion chamber placed immediately after the combustion chamber. The temperature in the post-combustion chamber is higher then the temperature in the combustion chamber and the gases remain therein for a longer period of time, such that a second combustion reaction takes place.

Accompanying FIGS. 1 and 2 show post-combustion chambers as described in the literature. FIGS. 3 to 5 relate more particularly to the present invention.

In FIG. 1, the gas coming from a combustion chamber 1 and charged with carbon black which would normally clog up filters 2 passes initially through a post-combustion chamber 3 filled with bulk refractory grains 4 presenting a large radiating area. These grains may be silicon carbide, corundum, . . .

The bed 3 of refractory grains is maintained at high temperature (more than 850° C.) in an oxidizing atmosphere, e.g. by direct heating using a burning 5.

The disposition of the burner is such that the gases charged with carbon black pass through the flame of the burner before engaging the bed of refractory materials.

The flow rate of air entering the incinerator is adjusted in such a manner that the gases leaving the combustion always contain a few percent of oxygen.

These gases are raised to a temperature which is high enough to ensure combustion of carbon black and they pass through the bed which is maintained at high temperature. As a result, the gas is repeatedly shocked and changed in direction, thereby increasing its transit time, and above all increasing the transit time of the particles of carbon black, thus favoring combustion thereof.

In the long term, the filter bed clogs up and it needs to be replaced. Heretofore, the entire chamber has been emptied and refilled with new grains.

The refractory grains removed are technological waste that needs to be stored. When nuclear waste is incinerated, the used filter bed is charged with radioactive particles and must be stored in special containers providing safe storage, i.e. storage where there is no risk of radioactive particles being disseminated into the environment. In the long term, such operations of replacing and storing all of the refractory grains are expensive.

In addition, the Applicant has observed that the top portion of the filter bed is damaged to a greater extent than the remainder of the bed by virtue of being directly exposed to the flame of the burner.

Grains which have numerous points when new end up having a surface which damaged and, eroded (i.e. the points are rounded), and sintering is also observed on the surfaces of the grains.

It is therefore the top portion of the bed which needs to be removed.

In order to reduce the quantity of refractory grains that are used and stored, the Applicant proposes a post-combustion chamber having a Y-shaped bottom portion, with the two branches of the Y being filled up to different levels with refractory grains.

Such a disposition has already been described by the Inventor at the ASME International Waste Management Conference held in Hong Kong, Nov. 29 to Dec. 5, 1987.

FIG. 2 shows such an embodiment in greater detail in which the gases coming from a combustion chamber 6 are heated by a burner 7 prior to passing into the post-combustion chamber 8.

As in the prior art of the above-mentioned patent, the post-combustion chamber 8 has a conical bottom 9. Said bottom is extended by a tube 10 in order to impart generally Y-shaped, siphon-forming geometrical shape thereto.

The filter bed 11 is thus removed by gravity into a vat 12 when a throttle valve 13 is opened allowing the grains to slide over the conical bottom.

The post-combustion chamber 8 is separated by a vertical wall 14 into two compartments 15 and 16 both containing a filter bed of the same type as that described in the above-mentioned prior patent.

In the invention the two branches of the siphon are filled to different depths. The level of the bed in the gas inlet compartment is lower than in the other compartment (i.e. the level in compartment 15, FIG. 2, is lower).

This difference in filter bed level firstly makes it possible for the gases entering the compartment 15 to expand prior to coming into contact with the bed, thereby reducing the speed with which the gases pass through said bed, and secondly ensures that the combustion reaction and the filtering take place for the most part in the compartment 16.

Only the top portion of the filter bed situated in the compartment 15 is exposed to the flames of the burner and to the highest temperatures. As a result, the quantity of grains whose surfaces are damaged is reduced.

When clogging occurs, enptying via the siphon serves to empty to compartment 15 completely while only emptying the compartment 16 partially.

This gives rise to a saving in refractory grains.

The bed is returned to its initial two levels by topping up with grains of refractory materials poured in via an opening 17 provided in the top of the compartment 16.

The two compartments are in communication with each other so the level also rises in the compartment 15.

The Applicant has observed that it is not always easy to empty and refill a filter bed as described above: grains which are clogged to a greater or lesser extent and agglomerated to a greater or lesser extent may form steps or baffles on the conical bottom and hinder the flow of grains into the siphon. Further, grains do not always flow properly from the compartment 16 into the compartment 15, and as a result the level in the compartment 15 is not always guaranteed.

Another drawback has also been observed in the implementation of said post-combustion chamber. The vertical wall 14 separating said chamber into two compartments must be capable of withstanding lateral thrust from the aggregates of grains on both sides thereof and it must also be capable of compensating for thermal expansion during operation.

The wall is normally made of refractory bricks and it is relieved of stress by thrusting against shaped iron pieces. The assembly is normally locked into place using spring-loaded pushers or draw bars.

This type of locking is bulky and difficult to apply when the chamber is provided with an air-tight jacket, containing a flow of air, as is necessary, for example, when there is a danger of contamination (i.e. when incinerating nuclear waste). The problem is that the jacket is itself not particularly strong and makes it difficult to install force compensators securely.

SUMMARY OF THE INVENTION

In order to mitigate these drawbacks, the present invention provides a post-combustion chamber for treating the gases coming from a combustion chamber, the post-combustion chamber comprising a conical bottom extended by a tube, and being separated into two compartments by a vertical wall, with both of said compartments containing a filter bed, said bed rising to a lower level in the compartment via which the gases enter than in the other compartment, said chamber also including an opening for removing gases which have passed through said filter bed and an opening in the top of the compartment via which the gases leave for inserting filter bed material, wherein the bottom of the vertical wall is terminated by an arch of refractory bricks bearing against opposite surfaces of the conical bottom of the post-combustion chamber.

The exact shape of the "conical bottom" of the post-combustion chamber is not critical: it may be constituted by one or more portions of cones which are suitable interconnected, however it may also comprise plane surfaces which slope relative to the vertical or, indeed, it may be constituted solely by plane surfaces constituting a truncated terahedron. BRIED DESCRIPTION OF THE DRAWINGS An embodiment of the invention is described by way of example with reference to the accompanying drawings, in which.

MORE DETAILED DESCRIPTION

Figure 1:
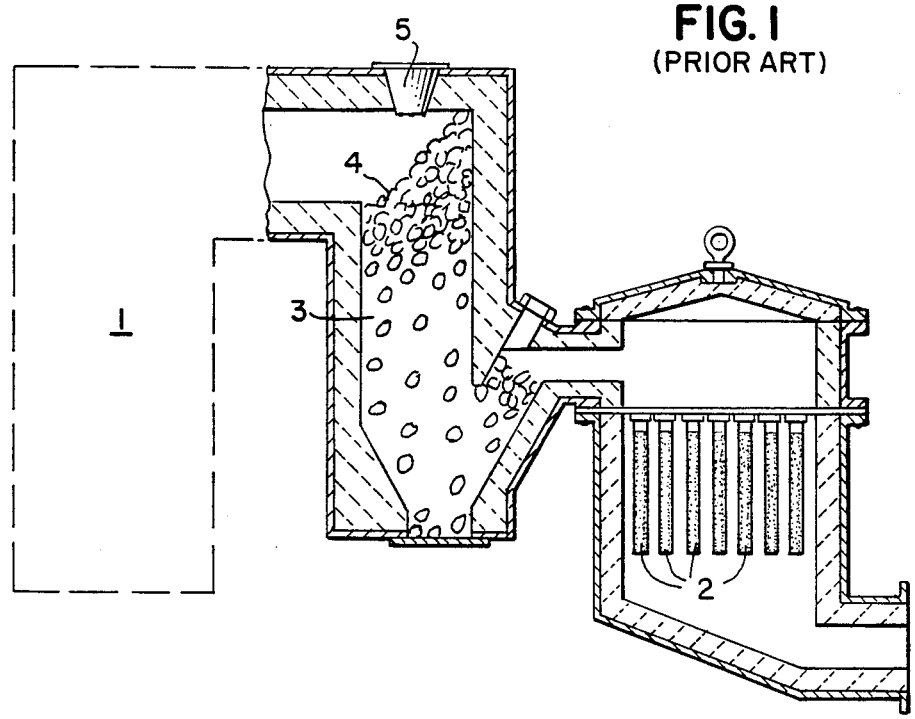
FIGS. 1 and 2 are sections through prior art devices, as described above.

The walls 18 of said post-combustion chamber are made of refractory bricks over a thickness suitable for obtaining the desired degree of heat insulation. The wall comprises rectilinear portions 19 and sloping portions 20 constituting the conical bottom 21.

The bottom of the chamber is closed by a floor 22 and the top of the chamber is closed by a ceiling 23, both made of refractory bricks.

The openings required for passing various gases, for filling or emptying the filter bed, etc., are provided through said walls and ceiling.

Figure 3:
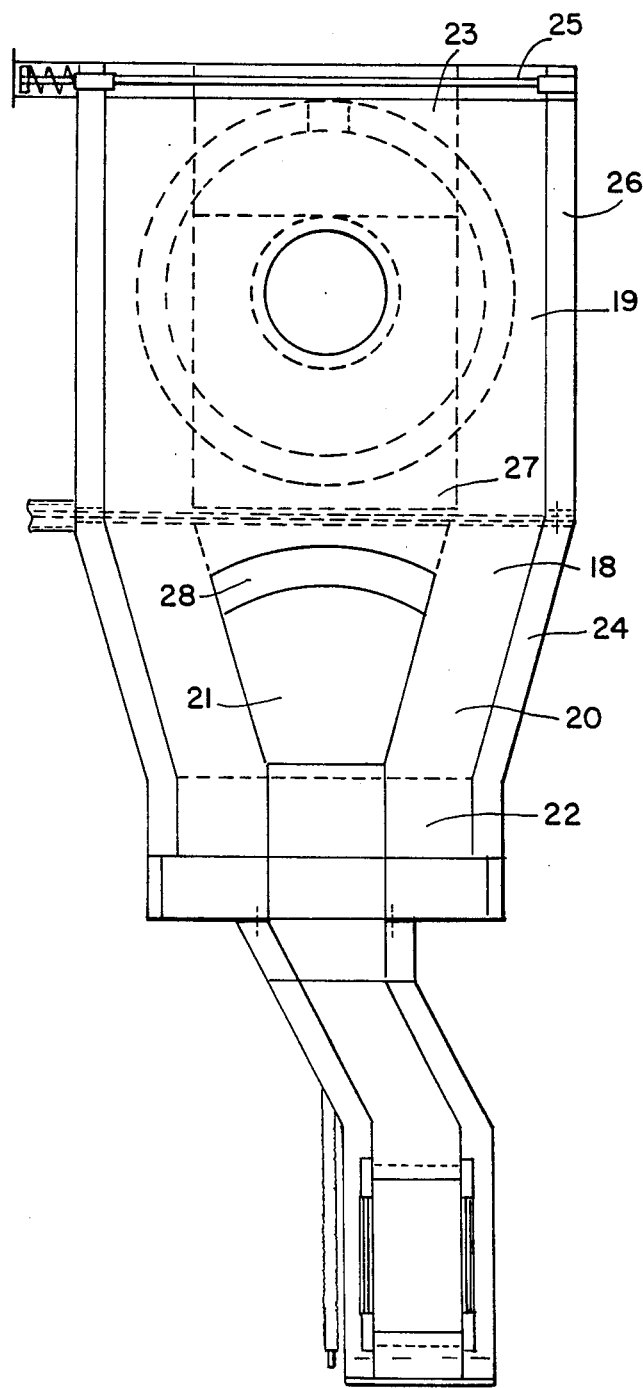
FIG. 3 is a section through a post-combustion chamber in accordance with the invention taken in a plane perpendicular to the plane of FIG. 2.

FIG. 3 shows a special post-combustion chamber having a double-walled jacket 24 including an internal flow of air together with draw bars and beams 25 and 26 for fixing it to a building.

Figure 4A:
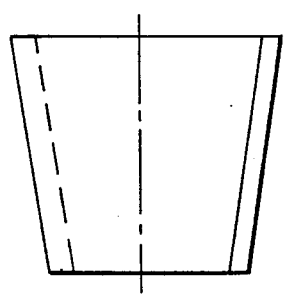
FIGS. 4a to 4c are views of refractory bricks for constituting the dividing wall.
Figure 4B:
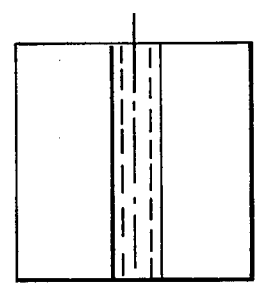
Figure 4C:
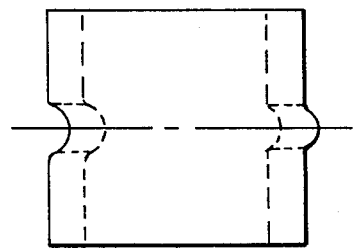

The wall 27 in accordance with the invention is made of refractory bricks which preferably include tongues and grooves as shown in FIGS. 4a and to 4c, so as to make it possible to obtain a monolithic assembly which is held together by a special cement.

Figure 5:
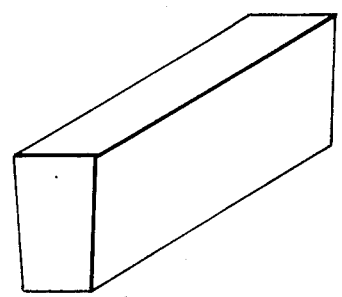
FIG. 5 is a perspective view of an arch-forming brick.

The bottom of the wall is terminated by an arch 28 made of refractory bricks bearing against the walls of the post-combustion chamber. Advantageously, the arch is constituted by bricks which are trapezoidal in shape (see FIG. 5) and whose dimensions may vary depending on their positions within the arch. It is also possible to use bricks which are in the form of parallelograms provided with keys and notches so as to interfit without adding cement.

The arch 28 bears against the sloping wall 20 of the conical bottom 21 of the chamber so as to provide a wall which goes down far enough inside the chamber to reduce the quantity of refractive grains that need to be removed.

By using an arch instead of a rectilinear wall bottom, it is possible to improve emptying and filling of the filter bed. The arch opens up a space making it possible to give the inclined walls forming the conical bottom slopes of not less than 45°, thereby making it very easy to remove the refractory grains. It is preferable for the slope of the sloping wall in the compartment 15 via which the gases enter to be steeper than the slope in the other compartment so as to facilitate removing referactory gains from the compartment 15 compared with removing them from the compartment 16.

The space disengaged by the arch also makes it possible to improve the flow of refractory grains during filling. The grains now have enough room to pass from one compartment to the other and the lower level required in compartment 15 is reached more rapidly, more easily, and more reliably.

Such a device may be used for incinerating household waste, for example. It has been used with success for incinerating nuclear waste. The waste in question is based on cellulose (paper, card, rags) and plastic (polyethylene, polyvinyl chloride). The calorific value of such waste is at least 30,000 kJ/kg.

The combustion chamber is constituted by a pyrolysis oven. The temperature in the post-combustion chamber is greater than 1200° C, whereas the temperature in the combustion chamber is only 1000° C.

The conical bottom has a slope of 45° in the compartment 16 and a slope of 55° in the compartment 15. The rise of the arch is 250 mm for a span of 1 m. It bears substantially against the middles of the walls of the conical bottom (in two parts).

In this way, only one third of the filter bed needs changing each time. The results of radioactivity measurements show that a large portion of the radioactive substances which enter the post-combustion chamber are retained in a filter bed of silicon carbide:

gases entering the chamber: 4,000 counts per second; and gases leaving the chamber: 100 counts per second.

Measurements also show that combination in the combustion chamber and in the post-combustion chamber make it possible to retain 95% of the ash and fly ash.

I claim:

1. A post-combustion chamber for treating the gases coming from a combustion chamber, the post-combustion chamber comprising a conical bottom extended by a tube, and being separated into two compartments by a vertical wall, with both of said compartments containing a filter bed, said bed rising to a lower level in the compartment via which the gases enter than in the other compartment, said chamber also including an opening for removing gases which have passed through said filter bed and an opening in the top of the compartment via which the gases leave for inserting filter bed material.

2. A post-combustion chamber for treating the gases coming from a combustion chamber, the post-combustion chamber comprising a conical bottom extended by a tube, and being separated into two compartments by a vertical wall, with both of said compartments containing a filter bed, said bed rising to a lower level in the compartment via which the gases enter than in the other compartment, said chamber also including an opening for removing gases which have passed through said filter bed and an opening in the top of the compartment via which the gases leave for inserting filter bed material, wherein the bottom of the vertical wall is terminated by an arch of refractory bricks bearing against opposite surfaces of the conical bottom of the post-combustion chamber.

* * * * *

UNITED STATES PATENT AND TRADEMARK OFFICE
CERTIFICATE OF CORRECTION

PATENT NO. : 4,945,838

DATED : August 7, 1990

INVENTOR(S) : SERGE CARPENTIER

Page 1 of 2

It is certified that error appears in the above-identified patent and that said Letters Patent is hereby corrected as shown below:

Column 2, line 49: Change "enptying" to -- emptying--

Column 2, line 50: Change "to" to --the--

Column 3, line 41: Change "BRIED" to --BRIEF--

Figure 2:
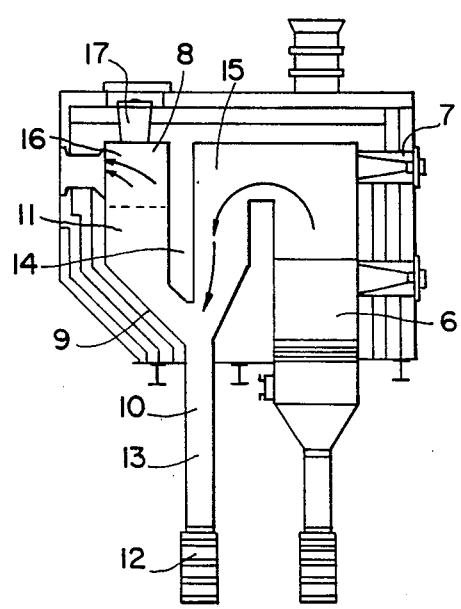

Sheet 1, Figure 2: Delete dotted line that appears in Figure 2 above number 11 as shown on the attached page.

Signed and Sealed this

Second Day of March, 1993

*Attest:*

STEPHEN G. KUNIN

*Attesting Officer*    *Acting Commissioner of Patents and Trademarks*

UNITED STATES PATENT AND TRADEMARK OFFICE
CERTIFICATE OF CORRECTION

PATENT NO. : 4,945,838

DATED : August 7, 1990

INVENTOR(S) : Serge Carpentier

It is certified that error appears in the above-identified patent and that said Letters Patent is hereby corrected as shown below:

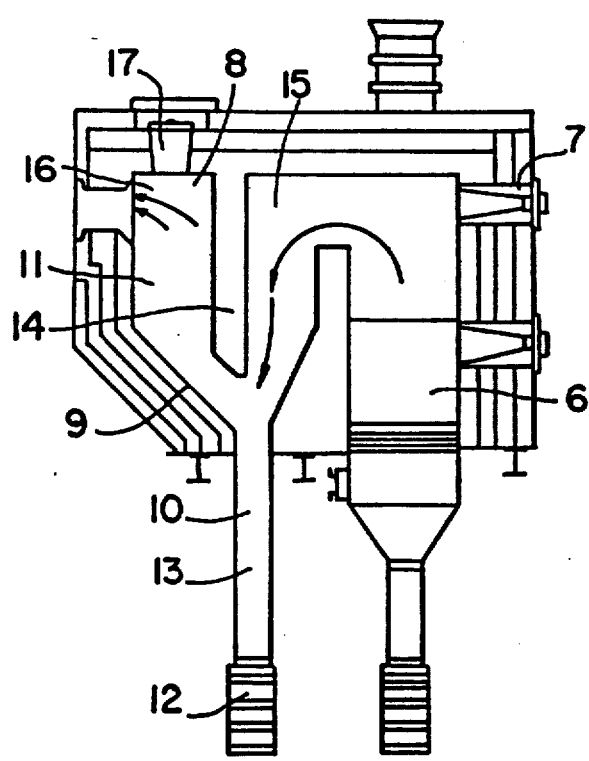

FIG. 2
(PRIOR ART)